United States Patent [19]

Smali

[11] Patent Number: 4,569,808
[45] Date of Patent: Feb. 11, 1986

[54] GLASS REPAIR METHOD AND APPARATUS

[76] Inventor: Luigi Smali, 1682A St. Clair Ave. West, Toronto, Ontario, Canada, M6N 1H9

[21] Appl. No.: 716,741

[22] Filed: Mar. 27, 1985

[51] Int. Cl.$^4$ ............................................... B32B 35/00
[52] U.S. Cl. .......................................... 264/36; 156/94;
  156/382; 264/102; 425/12; 425/13; 427/140; 428/63
[58] Field of Search ............... 29/402.18; 156/94, 286, 156/382; 264/36, 102; 425/12, 13; 427/140; 428/63

[56] References Cited

U.S. PATENT DOCUMENTS

| | | | |
|---|---|---|---|
| 3,562,366 | 2/1971 | Sohl | 264/36 X |
| 3,993,520 | 11/1976 | Werner et al. | 156/94 |
| 4,032,272 | 6/1977 | Miller | 425/12 |
| 4,047,863 | 9/1977 | McCluskey et al. | 425/13 |
| 4,132,516 | 1/1979 | Story | 425/13 |
| 4,200,478 | 4/1980 | Jacino et al. | 156/94 |
| 4,249,869 | 2/1981 | Petersen | 264/36 |
| 4,280,861 | 7/1981 | Schwartz | 156/382 |
| 4,385,015 | 5/1983 | Klettke | 264/36 |
| 4,385,879 | 5/1983 | Wilkinson | 425/12 |
| 4,419,305 | 12/1983 | Matles | 264/36 |

Primary Examiner—Robert A. Dawson

[57] ABSTRACT

A method and apparatus for repairing a bullseye crack or the like in a laminated windshield. The method comprises the steps of: applying one end of a cylinder in sealed relationship against the windshield to circumscribe the opening of the crack; charging a predetermined amount of resin into the cylinder; inserting one end of an annular piston into the cylinder and advancing the piston towards said one end of the cylinder whereby said resin rises within the piston; sealing the other end of the piston; retracting the piston away from said one end of the cylinder to create a vacuum within the cylinder; and after an interval unsealing said other end of the piston whereby atmospheric pressure is applied to the resin in the cylinder to cause the resin to flow into the crack. The apparatus comprises a cylinder including means at one end thereof to form a seal circumscribing the opening in the crack when said one end is pressed against the windshield; a piston movable coaxially in the cylinder and having an axial passage therethrough; a releasable means on the other end of the piston for sealing the axial passage; and means to press said one end of the cylinder against the windshield.

10 Claims, 3 Drawing Figures

GLASS REPAIR METHOD AND APPARATUS

FIELD OF THE INVENTION

This invention relates to glass repair and more particularly to the repair of windshields, for automobiles and the like, having bullseye cracks, star breaks and similar radial breaks leading from a centre, using resin.

BACKGROUND OF THE INVENTION

Automotive vehicle windshields are made of laminated glass having a resin interface. When the windshield is struck at a point on its outer surface a break is usually formed which is in the form of a bullseye or a star having cracks radiating, from a point opening on the surface, outwardly and downwardly through the outer lamination to the resin interface. Differing methods and devices have been developed which enable such cracks to be repaired. One such method and device is disclosed in U.S. Pat. No. 3,993,520 issued Nov. 23, 1976 in the name of Werner et al, in which the resin is inserted in the sleeve of the device and a pressure screw forces the resin into the windshield crack. The pressure is applied for several minutes and then the pressure screw is retracted to form a vacuum which allows dissolved air bubbles in the resin to leave the break. The problem with such a device is that the structure is complicated in that a special sleeve must be used in the cylinder to obtain the vacuum and there is no way to reestablish atmospheric pressure, i.e. the device acts like a syringe.

It is an object of the present invention to provide an improved method and apparatus for filling a bullseye crack or a star break in an automotive windshield.

SUMMARY OF THE INVENTION

Essentially the invention consists of a method of repairing a bullseye crack or the like in a laminated windshield, comprising the steps of: applying one end of a cylinder in sealed relationship against the windshield to circumscribe the opening of the crack; charging a predetermined amount of resin into the cylinder; inserting one end of an annular piston into the cylinder and advancing the piston towards said one end of the cylinder whereby said resin rises within the piston; sealing the other end of the piston; retracting the piston away from said one end of the cylinder to create a vacuum within the cylinder; and after an interval unsealing said other end of the piston whereby atmospheric pressure is applied to the resin in the cylinder to cause the resin to flow into the crack.

In another aspect the invention consists of an apparatus for repairing a bullseye crack or the like in a laminated windshield having a resin interface, comprising a cylinder including means at one end thereof to form a seal circumscribing the opening in the crack when said one end is pressed against the windshield; a piston movable coaxially in the cylinder and having an axial passage therethrough; a releasable means on the other end of the piston for sealing the axial passage; and means to press said one end of the cylinder against the windshield.

BRIEF DESCRIPTION OF THE DRAWINGS

An example embodiment of the invention is shown in the accompanying drawings in which.

DESCRIPTION OF PREFERRED EMBODIMENT

Figures 1, 2, 3:
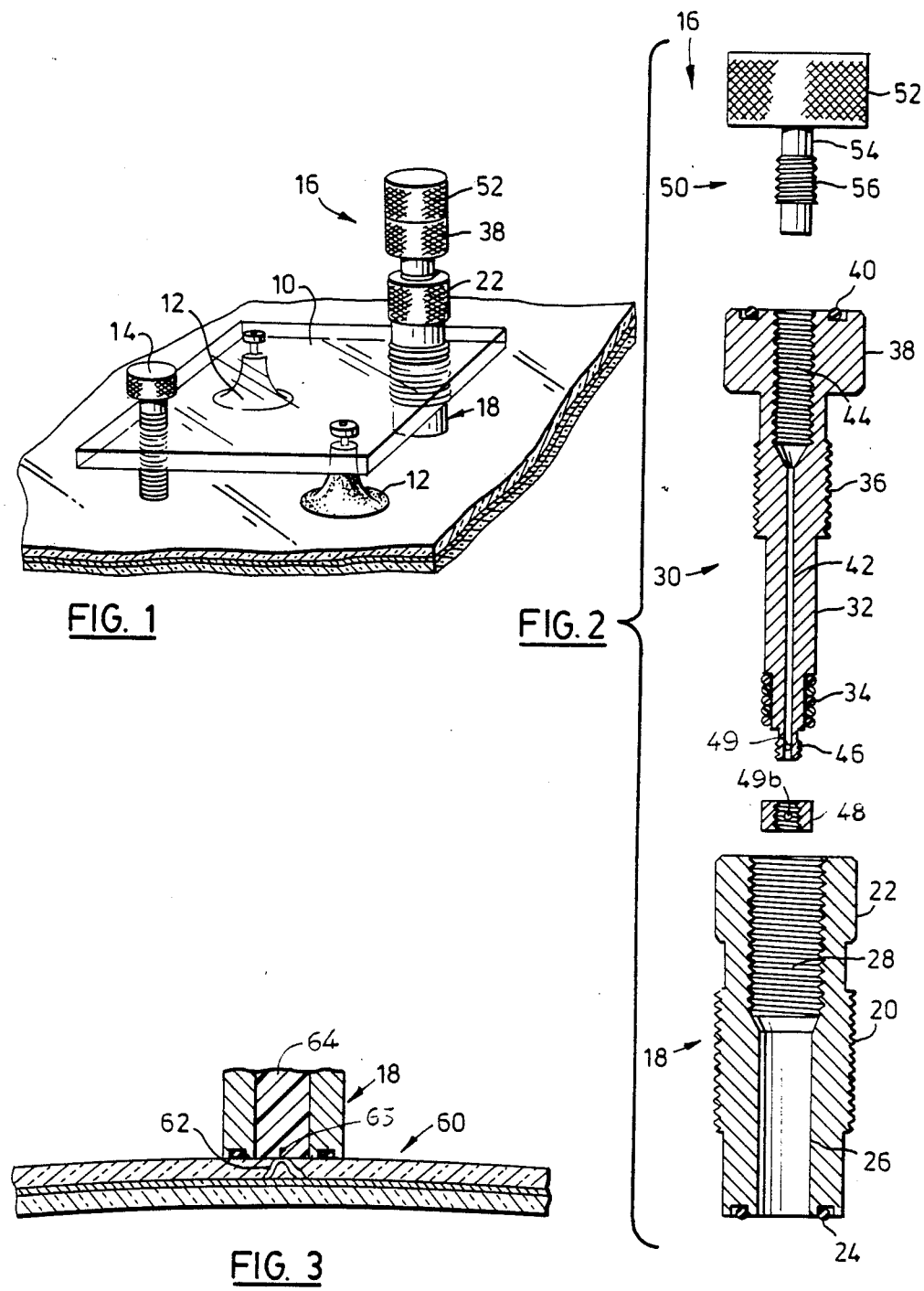
FIG. 1 is a perspective view of a repair apparatus positioned on a windshield of an automotive vehicle.
FIG. 2 is an exploded cross-sectional view of the injection device of the apparatus of FIG. 1.
FIG. 3 is a cross-sectional view of the windshield of FIG. 1 showing the injection device of FIG. 2 applied to a crack therein.

The example apparatus shown in the drawings consists of a square mounting plate 10 carrying a pair of suction cups 12 mounted in opposed corners of the plate. Mounted in the other two opposed corners of plate 10 are an externally threaded levelling screw 14 and an externally threaded injection device 16 respectively, each engaging a threaded bore in the plate.

As seen in FIG. 2, injection device 16 consists of a cylinder 18, a piston 30 and a valve 50. Cylinder 18 carries external threads 20, a knurled head 22, an O-ring 24 in the face of its lower end and an axial bore 26 having internal threads in its upper portion 28. Piston 30 is movable coaxially in bore 26 of cylinder 18 and comprises a rod 32 with a sealing ring 34 consisting of a plurality of O-rings, a threaded shank 36 and a knurled head 38 with an O-ring 40 in the upper face of head 38. An axial bore 42 extends through piston 30, the bore being expanded and having internal threads in its upper portion 44. The lower end portion 46 of rod 32 below sealing ring 34 is reduced in diameter and externally threaded to engage an internally threaded nut 48. A lateral passage 49a leads from central bore 42 to register with a lateral passage 49b in nut 48 when the washer is fully engaged on end portion 46. Valve 50 comprises a knurled cap 52 and a stem 54 which carries external threads 56.

Rod 32 of piston 30 fits slidably in bore 26 of cylinder 18 and the threads of shank 36 of the piston engage the threads of upper portion 28 of bore 26 of the cylinder. Stem 54 of valve 50 is receivable in the upper portion of bore 42 of piston 30 and threads 56 engage the threads in upper portion 44 of that bore. The parts are proportioned so that the lower end of rod 32 of piston 30 is flush with the lower end of cylinder 18 when head 38 of the piston is screwed down to abut head 22 of the cylinder, and cap 52 of valve 50 may be screwed down to be tightened against O-ring 40 of head 38 of the piston.

Before operating the apparatus, crack 62 may be first dried by using a hydroscopic liquid such as alcohol or acetone to draw out the moisture. This step is necessary for an old crack where rain has penetrated it.

In the operation of the apparatus, mounting plate 10 is placed on the damaged windshield 60 of a vehicle, as seen in FIG. 3, with cylinder 18 located directly over the bullseye or star break 62, circumscribing opening 63 of the crack and with the mounting plate parallel to the surface of the windshield. After suction cups 12 have been pressed down on windshield 60 to anchor mounting plate 10, levelling screw 14 and cylinder 18 are turned to seal the lower end of cylinder 18 against the windshield by means of O-ring 24.

In the first operational step, piston 30 is screwed into cylinder 18 and valve 50 is screwed into the piston until O-ring 40 seals the interface. Then piston 30 is retracted a small amount to create a vacuum in cylinder 18. This step, while not necessary to the essence of the invention, acts to diffuse moisture from crack 62 if the crack is a new one.

In the next step, a predetermined amount of liquid resin 64 is charged into bore 26 of cylinder 18 and rod 32 of piston 30 is inserted into bore 26, the piston being screwed down and advanced into the bore until resin is seen rising in upper portion 44 of bore 42 of the piston. Stem 54 of valve 50 is then inserted into upper portion 44 of bore 42 of piston 30 and cap 52 is screwed down until it abuts O-ring 40 to seal the interface with head 38. Next, rod 32 of piston 30 is unscrewed to retract or raise rod 32 in bore 26 of cylinder 18 to create a vacuum above resin 64, allowing the air in the bullseye to be sucked up through the resin into the vacuum. This operation can be repeated as desired. When atmospheric pressure is reestablished by opening valve 50 the resin will flow into the crack by a combination of suction underneath the resin and the atmospheric pressure above the resin, together with capilla action. If necessary, this step can also be repeated until crack 62 is filled with resin 64, whereupon the apparatus is removed from windshield 60 by breaking the seals of suction cups 12.

Coaxial lateral passages 49a and 49b allow any air trapped around the end of nut 48 of piston 30 to escape into bore 42 of the piston when the device is applied to a windshield at an angle to the vertical and piston 30 is advanced by rotation in cylinder 18 after the resin is inserted into the cylinder.

I claim:

1. A method of repairing a bullseye crack or the like in a laminated windshield, comprising the steps of:
    applying one end of a cylinder in sealed relationship against the windshield to circumscribe the opening of the crack;
    charging a predetermined amount of resin into the cylinder;
    inserting one end of an annular piston into the cylinder and advancing the piston towards said one end of the cylinder whereby said resin rises within the piston;
    sealing the other end of the piston;
    retracting the piston away from said one end of the cylinder to create a vacuum within the cylinder; and
    after an interval unsealing said other end of the piston whereby atmospheric pressure is applied to the resin in the cylinder to cause the resin to flow into the crack.

2. A method as claimed in claim 1 including the preliminary steps, after applying said one end of the cylinder against the windshield, of inserting the annular piston into the cylinder, sealing said other end of the piston, retracting the piston in the cylinder, and after an interval unsealing said other end of the piston whereby moisture is diffused from the crack.

3. A method as claimed in claim 1 including the additional step, after retracting the piston, of advancing the piston towards said one end of the cylinder whereby the resin is forced into the crack.

4. A method as claimed in claim 1 including the step of repeating the steps of advancing and retracting the piston in the cylinder at predetermined intervals.

5. Apparatus for repairing a bullseye crack or the like in a laminated windshield having a resin interface, comprising:
    a cylinder including means at one end thereof to form a seal circumscribing the opening in the crack when said one end is pressed against the windshield;
    a piston movable coaxially in the cylinder and having an axial passage therethrough;
    a releasable means on the other end of the piston for sealing the axial passage; and
    means to press said one end of the cylinder against the windshield.

6. Apparatus as claimed in claim 5 wherein the means to press the cylinder against the windshield comprises a plate, a pair of spaced suction cups mounted on the plate for removable adherence to the windshield, and a levelling screw, the levelling screw and the cylinder being mounted on the plate in cruciform relation to the suction cups.

7. Apparatus as claimed in claim 5 in which the sealing means comprises a valve having a stem coaxially receivable in the passage of the piston and a cap movable into sealing engagement with said other end.

8. Apparatus as claimed in claim 7 in which the stem of the valve threadably engages the piston.

9. Apparatus as claimed in claim 5 in which the sealing means at said one end of the cylinder comprises an O-ring.

10. Apparatus as claimed in claim 5 in which the piston and the cylinder are threaded for interengagement.

* * * * *